United States Patent Office 3,355,225
Patented Nov. 28, 1967

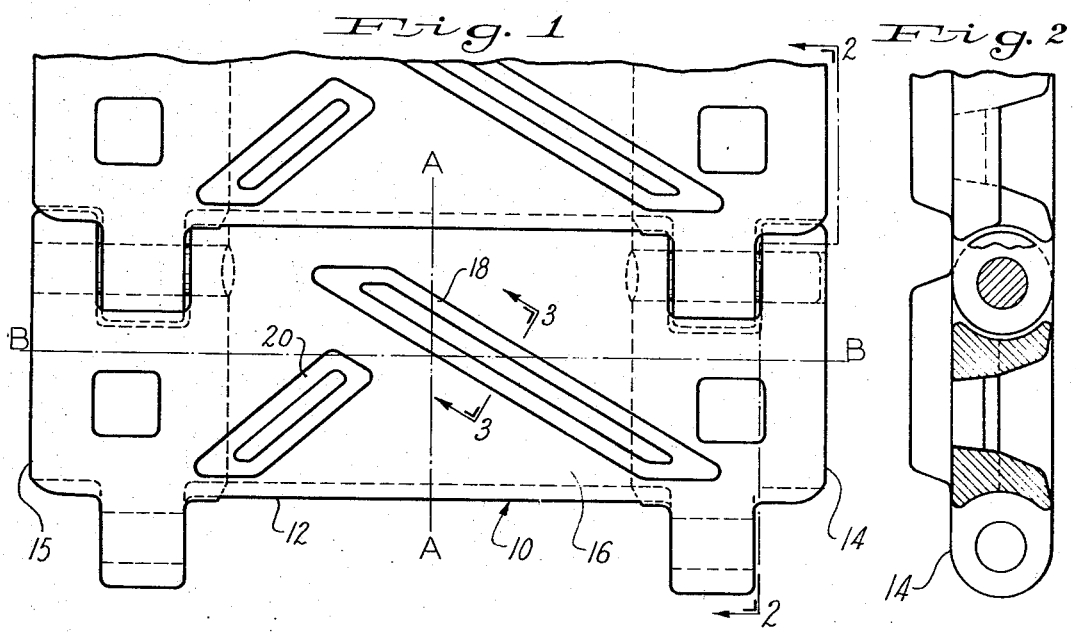
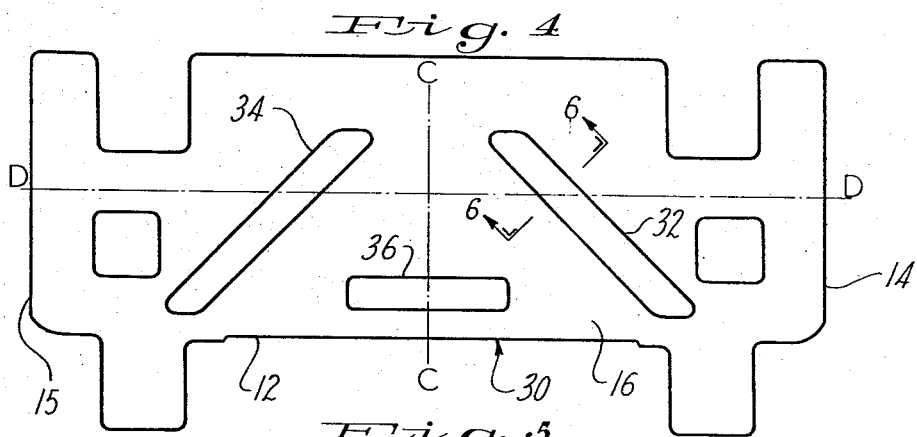
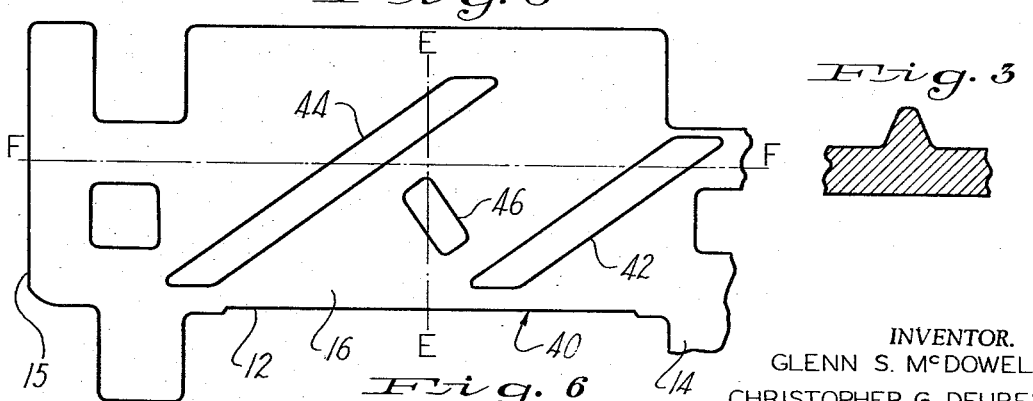

3,355,225
GROUSER CONFIGURATION FOR TRACK
TREAD LINKS
Glenn S. McDowell and Christopher G. Deurell, Claremont, N.H., assignors to Joy Manufacturing Company, Pittsburgh, Pa., a corporation of Pennsylvania
Filed Jan. 4, 1966, Ser. No. 518,589
10 Claims. (Cl. 305—53)

ABSTRACT OF THE DISCLOSURE

A tread link in which the ground engaging surface thereof has with at least one elongated grouser extending obliquely across a major portion thereof with a short grouser spaced from the elongated grouser or grousers and extending substantially laterally thereto intermediate the ends thereof to form an overlapping configuration with a gap between.

---

The following description and drawings are of preferred embodiments in which:

FIG. 1 is a plan view of the tread link of this invention also showing a fragmentary portion of second tread link pivotally connected thereto;

FIG. 2 is a sectional view taken substantially on line 2—2 of FIG. 1;

FIG. 3 is a sectional view taken substantially on line 3—3 of FIG. 1;

FIG. 4 is a plan view of a second embodiment of the tread link of this invention;

FIG. 5 is a plan view of a third embodiment of the tread link of this invention;

FIG. 6 is a sectional view taken substantially on lines 6—6 of FIG. 4.

As shown in FIG. 1 the tread link of this invention, generally indicated at 10, comprises a rectangular flat plate portion 12 integrally formed with a pair of parallel chain links 14 and 15, respectively right and left hand as viewed in FIG. 1, at opposite sides of portion 12, with the upper surface of the chain links 14 and 15 coplanar with the upper surface of the plate portion 12 to form the ground engaging surface or tread 16 of the tread link 10.

For descriptive purposes each of the tread link plan views is shown to have a transverse center line and a longitudinal center line: A—A and B—B, respectively, in FIG. 1; C—C, D—D in FIG. 4; and E—E, F—F in FIG. 5. The direction toward the top of the sheet in these figures will be taken as the forward direction in the description, while the left hand surfaces as viewed in FIG. 2 will be referred to as the upper surfaces of the links as seen in a complete track although in use these surfaces would move into contact with the ground. The tread link 10 so far described is more completely described and shown in U.S. Patent #2,438,961 issued on Oct. 4, 1949 to C. F. Ball and reference may be made thereto for further description of the tread link 10.

As seen in FIG. 1 the tread link 16 is provided with a long grouser 18 and a short grouser 20 of generally trapezoidal cross section (see FIG. 3) elongated in a direction parallel to the tread surface 16 and formed integral with the plate portion 12 or rigidly secured thereto as by welding or the like. The long grouser 18 extends obliquely across the major portion of the tread 16 beginning on a rearward portion of the upper surface of the right hand chain link 14 and extending obliquely forwardly across the upper surface of the portion 12 to a point substantially beyond the transverse center line A—A as well as extending beyond the longitudinal center line B—B. The short grouser 20 of similar cross section, elongated in a direction parallel to the tread 16 and also formed integral with the plate portion 12 or welded thereto, extends across a portion of the tread 16 beginning on a rearward portion of the tread surface of the chain link 15 and extending obliquely forwardly toward the long grouser 18 at an obtuse angle therewith. The end of the grouser 20 nearest the long grouser 18 is spaced therefrom by a substantial distance so that particles of soil or rock will be free to move through the gap or space formed between the grousers 18 and 20 rather than being able to pack into a corner as commonly found in angularly disposed grousers of the prior art. The short grouser 20 is so positioned as to form an overlapping configuration with the long grouser 18 as viewed in the direction parallel to the transverse center line A—A.

It is to be noted that the above described placement configuration of the grousers 18 and 20 provides the following functions: the oblique positioning of the grousers provides that a major portion of the tractive effect thereof will be available for additional traction in a direction parallel to the center line A—A which in turn is the direction parallel to the longitudinal axis of the machine to provide for machine travel; the oblique positioning further provides that a minor portion of the tractive effect of the grousers 18 and 20 will be available to provide additional traction in a direction parallel to the longitudinal center line B—B to prevent side motion of the machine; with the angular relationship being such as to approximately balance the sideward tractive effect in opposite directions. The gap between the grousers 18 and 20 eliminates a corner where soil or rock particles could pack together; the oblique positioning particularly of the long grouser 18 provides added strength to the plate portion 12 to oppose torsional loading on the plate portion 12; while the overlapping configuration provides additional strength to the plate 12 to oppose bending stress about any axis parallel to the transverse centerline A—A.

FIG. 4 shows a second embodiment of this invention in a tread link, generally indicated at 30, entirely similar to that of the above described tread link 10 up to and including the tread surface 16. The difference is that the grousers 18 and 20 of the tread link 10 are, in tread link 30, replaced by 3 grousers of a somewhat different design. It is to be noted that the right and left hand chain links 14 and 15, the tread link 16 and the plate portion 12 are included in the tread link 30 of the second embodiment.

As seen in FIG. 6 the cross section of the grousers on the tread links 30 is rectangular but this different cross section is entirely optional and whether this cross section or the one shown in FIG. 3 or some still different cross section is chosen will depend upon the type and condition of the surface for which the tread links are designed. The three grousers of the tread link 30 are the right hand grouser 32, the left hand grouser 34 and the central grouser 36 wherein the right hand grouser 32 having one end located on a rearward portion of the tread surface of the chain link 14 extends obliquely forwardly across the longitudinal center line D—D of link 30 toward but not reaching the transverse center line C—C of the tread link 30. Similarly placed, but oppositely oriented, the left hand grouser 34 extends from a rearward portion of the top surface of the chain link 15, obliquely forwardly across the longitudinal center line D—D toward but not reaching the transverse center line C—C of the tread link 30 leaving a considerable gap between the adjacent ends of the grousers 32 and 34. The central grouser 36 is placed parallel to the longitudinal center line D—D and spaced therefrom upon the opposite side of the center line D—D from that on which the gap between the ends of the grousers 32 and 34 occurs with the central grouser 36 having a length substantially greater than the length of that gap. It will be noted that the positioning of the grousers 32, 34 and 36 on the tread link 30 maintains gaps between the different grousers and at the same time provides the overlap on lines parallel to the transverse center line C—C thus providing extra strength to prevent bending about any axis parallel to C—C.

A third embodiment of the principle of this invention is shown in FIG. 5 wherein a tread link 40 entirely similar to the tread links 30 and 10, except for the grousers, is provided with three such grousers 42, 44 and 46 being right hand-left hand and central grousers, respectively, wherein the left hand grouser 44 beginning on a rearward portion of the upper surface of the chain link 15 extends forwardly and longitudinally of the tread link 40 crossing both the longitudinal center line F—F and the transverse center line E—E to a point substantially to the right of the transverse center line E—E. Spaced rearwardly from the left hand grouser 44 is the right hand grouser 42 parallel thereto and extending obliquely forwardly to the right ending on the upper surface of the chain link 14 beyond the right hand end of the plate portion 12. The central grouser 46, substantially normal to the grousers 42 and 44, extends partially across the space between the grousers 42 and 44 equally distant from the two grousers with a substantial gap therebetween so that no corner is developed for entrapping soil or rock particles. It is to be noted that the grousers 42 and 44 overlap the central grouser 46 along lines parallel to the transverse center line E—E so that, as in the case of the tread links 10 and 30 the tread link 40 is strengthened against bending about any line parallel to the transverse center line E—E. In general, tread link 40 provides the same advantages as those recited for the tread link 10.

Preferred embodiments of this invention having been hereinabove described and illustrated is to be realized that other modifications consonant with the principles of this invention are envisioned.

What we claim is:

1. A tread link for a self-laying track comprising: an elongated generally flat tread surface having a longitudinal center line and a transverse center line, a plurality of elongated grousers extending across and outwardly from portions of said tread surface, adjacent ones of said grousers being spaced from each other on and extending in their entirety along intersecting axes, at least one of said adjacent grousers extending across said longitudinal center line, and said adjacent grousers forming an overlapping configuration as viewed along lines parallel to said transverse center line.

2. A tread link as specified in claim 1 wherein at least one of said adjacent grousers extends across said transverse center line.

3. A tread link as specified in claim 1 wherein: said one of said grousers extends obliquely across a major portion of said tread surface, and another of said grousers is shorter than said one grouser and extends substantially normal to said one grouser.

4. The tread link as specified in claim 3 wherein said one grouser extends across both said transverse and said longitudinal center lines.

5. The tread link as specified in claim 3 wherein the angle between said one grouser and said longitudinal center line is substantially less than the angle between said other grouser and said longitudinal center line.

6. A tread link as specified in claim 1 wherein: said plurality of grousers consists of three grousers with two of said three grousers being in spaced parallel relationship and extending obliquely across said surface; and the third one of said three grousers extends across said surface between and substantially normal to said parallel grousers and spaced therefrom.

7. A tread link as specified in claim 1 wherein: said tread surface is generally rectangular; said plurality of grousers consists of three grousers with the first of said three grousers extending from a point inwardly adjacent one longitudinal edge of said surface and obliquely across said longitudinal center line toward but spaced in one direction from said transverse center line; the second of said three grousers extending from a point inwardly adjacent said one edge and obliquely across said longitudinal center line toward but spaced from said transverse center line in a direction opposite said one direction, the closest adjacent ends of said first and second grousers defining a channel therebetween; the third of said three grousers being equally spaced from said first and second grousers and extending along said tread surface across said transverse center line on the opposite side of said longitudinal center line from said channel, and said third grouser being longer than the width of said channel.

8. The tread link as specified in claim 1 wherein said tread link additionally comprises a rectangular flat plate portion integrally formed with a pair of laterally spaced parallel chain links at opposite sides of said plate portion.

9. A tread link as specified in claim 8 wherein each chain link has one surface coplanar with a surface of said plate portion and at least one of said grousers extends from one of said coplanar chain surfaces across a portion of said coplanar plate portion surface.

10. A tread link as specified in claim 2 wherein said plurality of grousers consists of said adjacent grousers only.

References Cited

UNITED STATES PATENTS

| | | | |
|---|---|---|---|
| 2,134,559 | 10/1938 | Junger | 305—54 |
| 2,350,445 | 6/1944 | Burgess | 305—56 X |
| 2,470,801 | 5/1949 | Boltman | 305—53 X |
| 2,483,961 | 10/1949 | Ball | 305—53 X |
| 2,626,649 | 1/1953 | Eiler | 152—209 |

FOREIGN PATENTS

| | | |
|---|---|---|
| 1,341,940 | 9/1963 | France. |
| 1,085,780 | 7/1960 | Germany. |

LEO FRIAGLIA, *Primary Examiner.*

RICHARD J. JOHNSON, *Examiner.*